(12) United States Patent
Fujita

(10) Patent No.: US 6,288,455 B1
(45) Date of Patent: Sep. 11, 2001

(54) POWER SUPPLY CIRCUIT STRUCTURE AND ELECTRIC EQUIPMENT USING THE SAME

(75) Inventor: Shinichi Fujita, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/282,338

(22) Filed: Mar. 31, 1999

(30) Foreign Application Priority Data

Apr. 9, 1998 (JP) .................................................. 10-097748

(51) Int. Cl.[7] ........................................................ H02J 9/00
(52) U.S. Cl. .................................................. 307/64; 307/66
(58) Field of Search .............................. 320/116; 307/66, 307/64; 363/21, 59, 60, 61; 327/536

(56) References Cited

U.S. PATENT DOCUMENTS

| | | | |
|---|---|---|---|
| 5,600,551 | * | 2/1997 | Luscher, Jr. .............................. 363/59 |
| 6,085,017 | * | 7/2000 | Rilly ........................................ 386/46 |
| 6,115,266 | * | 9/2000 | Matsui et al. ............................ 363/21 |

FOREIGN PATENT DOCUMENTS

| | | |
|---|---|---|
| 3161811 | 7/1991 | (JP) . |
| 386419 | 9/1991 | (JP) . |

* cited by examiner

*Primary Examiner*—Stephen W. Jackson
*Assistant Examiner*—Robert L. DeBeradinis
(74) *Attorney, Agent, or Firm*—Pillsbury Winthrop LLP

(57) ABSTRACT

Transformer has a primary connected via a power supply switch to a supply plug, and main power supply circuitry for supplying electric power to principal circuitry is connected to a secondary of the transformer. Auxiliary power supply circuitry for powering auxiliary circuitry, which requires backup power during an OFF state of the power supply switch, includes a rectifier circuit for rectifying electric power that is extracted via certified condensers from nodes connecting to the plug, and a stabilized power supply. This arrangement provides a power supply circuit structure which, during the OFF state of the power supply switch, can supply stable backup power with a minimized power loss, as well as well-performing electric equipment using such a power supply circuit structure.

6 Claims, 4 Drawing Sheets

POWER SUPPLY CIRCUIT STRUCTURE AND ELECTRIC EQUIPMENT USING THE SAME

BACKGROUND OF THE INVENTION

The present invention relates to electric equipment requiring supply of backup electric power during an OFF state of a power supply switch, and power supply circuit structures for use in such electric equipment.

In recent years, numerous pieces of electric equipment containing a microcomputer and semiconductor memory have been in practical use. In electric equipment of this type, like DSP amplifiers, the semiconductor memory, such as a SRAM (Static Random Access Memory), provided within or separately from the microcomputer normally requires supply of backup electric power to retain at least part of its storage function even after the power supply switch of the equipment is turned OFF.

Typical examples of the conventionally-known backup power supply scheme include the following.

(a) One where, as shown in FIG. 7, when a power supply switch SW connected with the primary winding of a transformer T is turned OFF, electric charge stored in a capacitor or condenser C connected with the secondary winding (or a separate secondary cell) is used as a backup power supply for a microcomputer and the like.

(b) One where, as shown in FIG. 8, a sub-transformer T2 is provided, separately from a transformer T of the main power supply, to comprise an auxiliary or backup power supply. Here, the primary winding of the sub-transformer is connected to a supply plug at a point closer than a power supply switch SW. Thus, even after the power supply switch SW is turned OFF, the backup power supply remains active as long as the plug is maintained in connection to the electric outlet.

(c) A compromise between the above-mentioned two schemes, where the sub-transformer provides a power backup while the supply plug is in connection to the electric outlet, and the condenser is caused to provide a power backup only when the supply plug is disconnected from the electric outlet.

However, the above-mentioned three conventional backup power supply schemes are not satisfactory for the following reasons. First, the scheme mentioned in item (a) above presents the problem that if the power supply switch remains turned OFF for a long time period, the condenser etc. would discharge electricity to thereby invite an unwanted loss of stored data although no substantial electricity is consumed by the backup power supply. In addition, deterioration of the condenser etc., occurring with the passage of time, would lead to a reduced backup time. Therefore, the other two schemes employing the sub-transformer, mentioned in items (b) and (c) above, are more popular nowadays.

But, with the item (b) and (c) schemes, there is encountered the problem that substantial electricity consumption by the sub-transformer is unavoidable, even though the power backup can be retained as long as the plug is kept in connection with the electric outlet. While the necessary power consumption for retaining stored data in the microcomputer etc. is nominal, usually on the order of $\mu A$ at most, the exciting current has to be constantly supplied to the sub-transformer even during an OFF state of the power supply switch, which would result in a power loss as great as several hundred mW that can never be ignored from the viewpoint of energy conservation.

SUMMARY OF THE INVENTION

It is therefore an object of the present invention to provide a power supply circuit structure which, during an OFF state of a power supply switch, can supply stable backup power with a minimized power loss, as well as well-performing electric equipment using such a power supply circuit structure.

According to one aspect of the present invention, there is provided a power supply circuit structure which comprises a main power supply system for supplying main electric power to electric equipment and an auxiliary power supply system for supplying backup auxiliary power to the electric equipment during an OFF state of the main power supply system, and which is characterized in that the main power supply system includes main power supply circuitry, a transformer that delivers a.c. power introduced via a supply plug to the main power supply circuitry and a power supply switch provided between a primary winding of the transformer and the supply plug, and the auxiliary power supply system includes auxiliary power supply circuitry and a certified condenser that satisfies a predetermined safety requirement and delivers the a.c. power introduced via the supply plug to the auxiliary power supply circuitry without intervention of the power supply switch.

Here, the term "certified condenser" refers to a ceramic condenser, film condenser or the like which satisfies at least one of four international safety requirements: UL(UL1414); CSA(C22.2 No.0, No.1); BSI(BS EN60065(1994)); and IEC384-14 Version 2(1993) and whose stable operation is guaranteed under a rated voltage of, say, 125 VAC.

In a situation where the supply plug has none of its terminals specified as a grounding terminal, the auxiliary power supply circuitry preferably includes a fill-wave rectifier circuit that rectifies the a.c. power supplied via the certified condenser from the supply plug. Conversely, in a situation where the supply plug has one of its terminals specified as a grounding terminal, the auxiliary power supply circuitry preferably includes a half-wave rectifier circuit which is made up of a rectifying diode that half-wave rectifies the a.c. power supplied via the certified condenser from a non-grounding terminal of the supply plug and a charge-pumping diode that is connected between a connection node, located between the rectifying diode and the certified condenser, and the grounding terminal of the supply plug.

In a case where such a power supply circuit structure is applied to electric equipment, it further comprises a remote-controlling power supply system including: a control circuit that receives a radio signal from a remote controller and outputs a power supply control signal based on the radio signal; a remote-controlling power supply circuit that supplies the control circuit with electric power necessary for operation of the control circuit; a sub-transformer that delivers the a.c. power introduced via the supply plug to the remote-controlling power supply circuit; and a power supply switch provided between a primary of the transformer and the supply plug. In this case, turning-ON/OFF of the power supply switch in the main power supply system is controlled in accordance with the power supply control signal outputted by the control circuit.

The present invention further provides electric equipment which comprises: principal circuitry that is supplied with electric power only when a power supply is in an ON state; a main power supply system for supplying main electric power to the principal circuitry; auxiliary circuitry that has to be supplied with the electric power even when the power supply is in an OFF state; and an auxiliary power supply system for supplying backup auxiliary power to the auxiliary circuitry during the OFF period of the power supply, and which is characterized in that the main power supply system includes main power supply circuitry, a transformer that delivers a.c. power introduced via a supply plug to the main power supply circuitry and a power supply switch provided between a primary winding of the transformer and the supply plug, and the auxiliary power supply system includes auxiliary power supply circuitry and a certified condenser that satisfies a predetermined safety requirement and delivers the a.c. power introduced via the supply plug to the auxiliary power supply circuitry without intervention of the power supply switch.

According to the present invention, the necessary backup power can be given, without employing a sub-transformer, even during the OFF state of the power supply switch by the auxiliary power supply circuit that uses the a.c. power extracted via the certified condenser. The certified condenser is not allowed to have very great capacity due to safety requirements, so that it is normally not possible to extract great electric power from the power supply. However, because the necessary backup power is only on the order of several $\mu A$, the extracted a.c. power can be sufficient for the backup purpose. Since substantially no power is consumed by the power-extracting certified condenser and diodes of a rectifier circuit constituting the auxiliary power supply circuit, the overall power consumption can be reduced to a considerable degree as compared to the conventionally-known techniques employing a sub-transformer. In addition, the present invention can supply backup power that remains stable for a long time period as compared to the known techniques.

The a.c. power of the auxiliary power supply system is extracted, out of a node located closer to the supply plug than the power supply switch connected with the primary of the transformer, via the certified condenser that satisfies a predetermined safety requirement imposed on the primary of the power supply depending on actual power consumption by the electric equipment. By such intervention of the certified condenser, circuits following the condenser can be treated as connected with the secondary, which can thereby substantially narrow spacings between wiring and between components, such as diodes, in the rectifier circuit.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
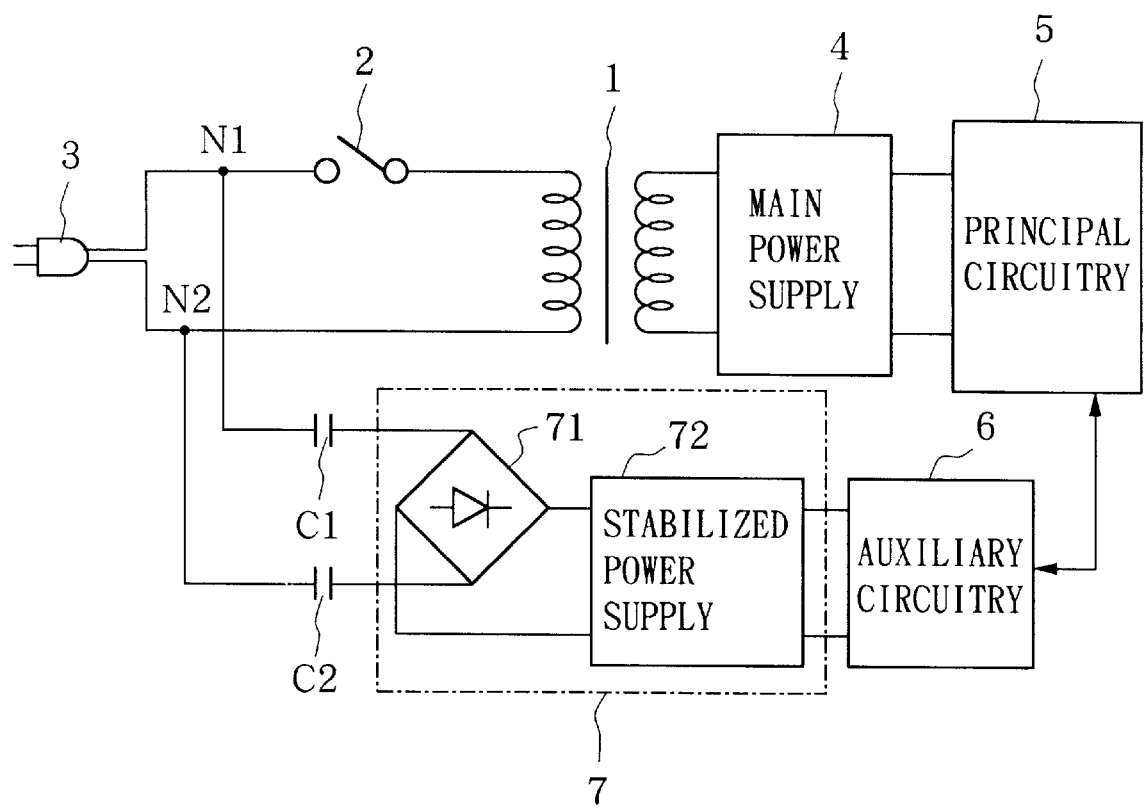
FIG. 1 is a block diagram outlining an exemplary organization of a power supply circuit structure in accordance with an embodiment of the present invention and electric equipment employing the power supply circuit structure.

FIG. 1 is a block diagram outlining an exemplary organization of a power supply circuit structure in accordance with an embodiment of the present invention and electric equipment employing the power supply circuit structure. Primary winding of a transformer 1 has one end connected to a supply plug 3, for connection to an electric outlet (not shown), via a power supply switch 2 and the other end connected directly to the plug 3. Main power supply circuitry 4 is connected with a secondary winding of the transformer 1, and this main power supply circuitry 4 supplies operating electric power to principal circuitry, such as a power amplifier and DSP, of the electric equipment. The main power supply circuitry 4 is turned ON and OFF by the power supply switch 2 connected with the primary. Thus, these components, cooperating to supply the operating power to the principal circuitry together, constitute a main power supply system.

Auxiliary power supply system to be described below supplies backup power to auxiliary circuitry 6 of the electric equipment. The auxiliary circuitry 6 includes, for example, a microcomputer, CPU or SRAM that requires backup power while the main power supply circuitry 4 is in the OFF state. Thus, auxiliary power supply circuitry 7 is provided, in addition to the main power supply circuitry 4, as a backup power supply for the auxiliary circuitry 6. To the auxiliary power supply circuitry 7 is supplied a.c. power that has been extracted from a first node N1 located between the power supply switch 2 connected with the one end of the primary of the transformer 1 and the plug 3 and from a second node N2 located between the other end of the primary of the transformer 1 and the plug 3. In this illustrated example, in order to allow the auxiliary power supply circuitry 7 to function or to be treated as a secondary power supply separate from the main power supply, first and second certified condensers C1 and C2 are connected between the nodes N1, N2 and the auxiliary power supply circuitry 7, which satisfy conditions that are required of the primary in accordance with the safety standards of the electric equipment. Generally, the certified condensers C1 and C2 are not suited to extract great electric power therefrom due to their small capacity and high internal impedance, but they will not present any significant problem as long as the auxiliary circuit 6 is a microcomputer or the like that can be properly backed up with very low power consumption. Specifically, the certified condensers C1 and C2 may each be a $BaTiO_3$-based ceramic condenser having a capacity of several thousand $\square F$.

The auxiliary power supply circuitry 7 includes a rectifier circuit 71 and a stabilized power supply 72 for stabilizing a rectified output from the rectifier circuit 71; however, the stabilized power supply 72 in the illustrated example is not necessarily essential and may be omitted as necessary.

Figure 2:
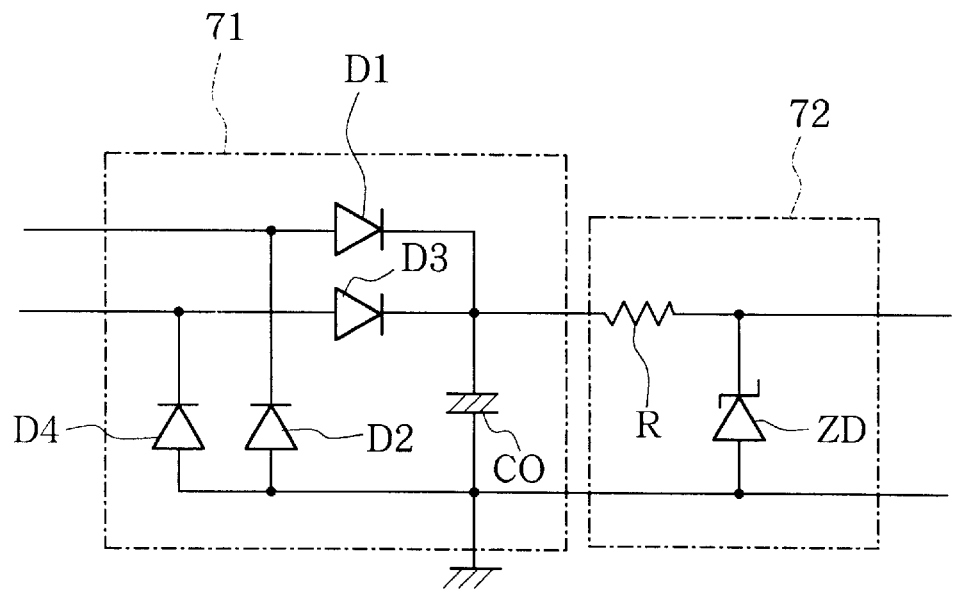
FIG. 2 is a diagram showing a structure of auxiliary power supply circuitry of FIG. 1.
Figure 3:
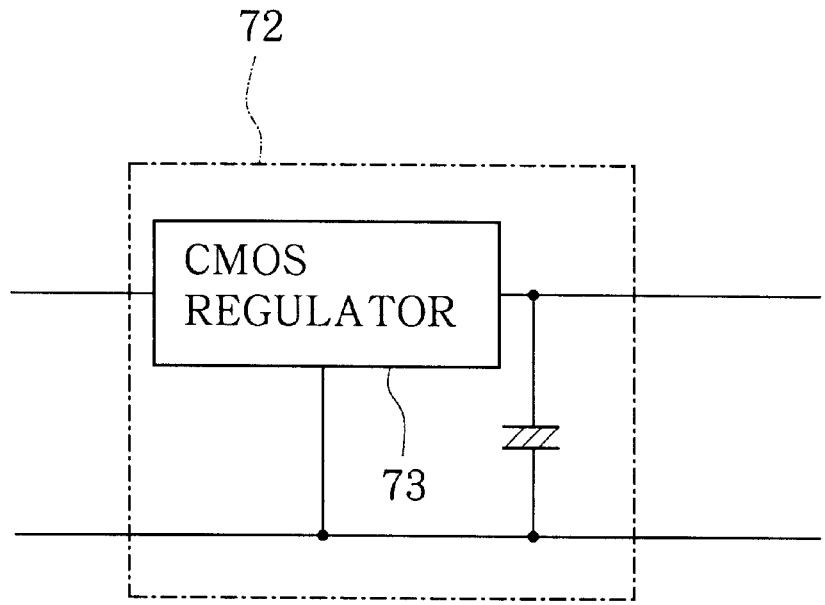
FIG. 3 is a diagram showing a modification of a stabilized power supply circuit of FIG. 1.

FIG. 2 shows a detailed example of the above-mentioned auxiliary power supply circuitry 7. The rectifier circuit 71 includes a conventional full-wave rectifier circuit made up of four diodes D1 to D4, and a smoothing condenser C0. If the auxiliary circuitry 6 is a microcomputer or the like, then sufficient backup power can be given by supply voltage not smaller than 2V. In such an application, it is preferable that the stabilized power supply 72 have high input impedance and high pressure resistance; for example, the stabilized power supply 72 may comprise a resistor R and a Zener diode ZD. Alternatively, the stabilized power supply 72 may comprise a three-terminal CMOS regulator 73, as shown in FIG. 3, which can operate with less power consumption.

In this embodiment, the auxiliary power supply circuit 7 for giving the power backup does not use a sub-transformer and thus the power consumption necessary for the backup can be reduced to a substantially negligible degree. In the auxiliary power supply circuitry 7 illustrated in FIG. 2, it is, in effect, only the resistor R and Zener diode ZD that consume electric power; because very small power normally suffices for the backup purpose, the power consumption can be reduced to an extremely low level by making the resistance value of the resistor R sufficiently high.

Further, the illustrated example uses the certified condensers C1 and C2, in place of a transformer, for extraction of the a.c. power out of the auxiliary power supply circuitry 7. By so doing, the auxiliary power supply circuitry 7 can be treated as a separate secondary power supply from the viewpoint of safety standards or requirements, so that various circuit components including electrical wiring can be laid out close to each other with very small spacings, for example, on the order of 0.5 mm. The certified condensers C1 and C2 may be omitted, if desired, without inviting any serious inconvenience to the circuit functions; in such a case, however, the auxiliary power supply circuitry 7 and other components following the same will be treated as connected with the primary, so that it is necessary to provide a particular insulating structure and, if any output terminal is extended from a particular point, there arises a need to provide, at that point, such insulation that satisfies the safety requirements for the primary and secondary.

The rectifier circuit 71 of FIG. 2 is shown and described here in relation to a case where none of the two terminals of the supply plug 3 is specified as a grounding terminal and thus the full-wave rectifier circuit is used. In such a situation where the supply plug has a specified grounding terminal, however, the rectifier circuit 71 can be of a simplified structure.

Figure 4:
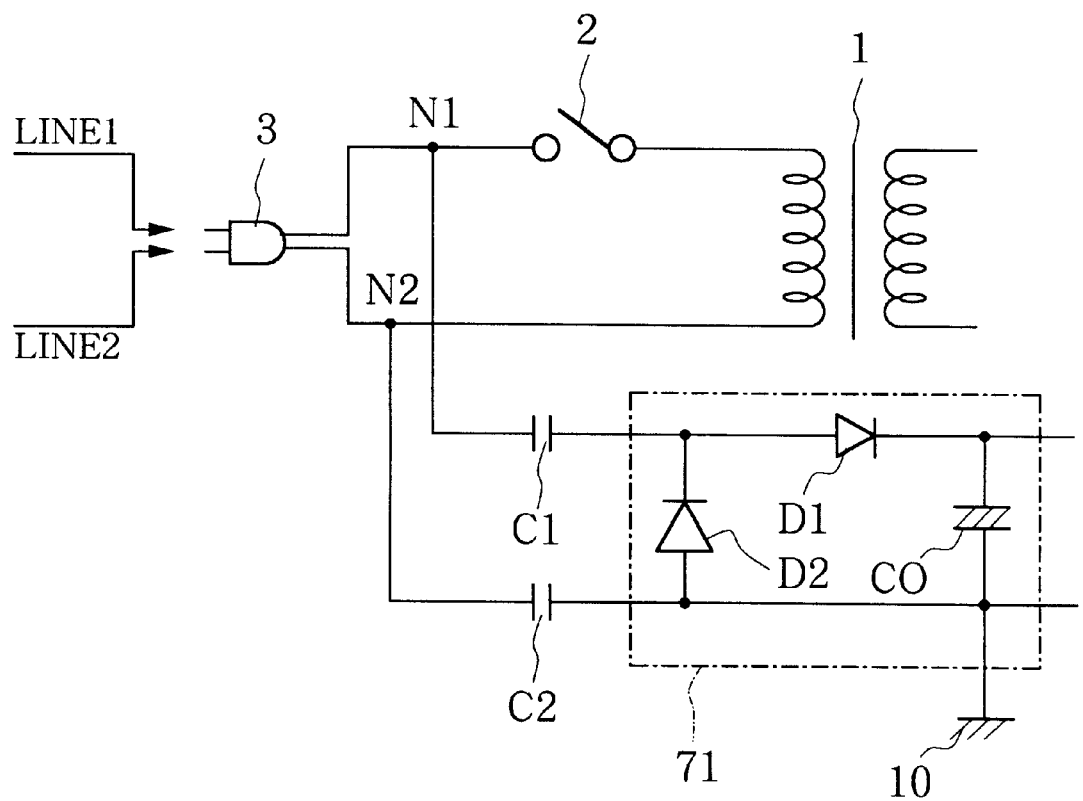
FIG. 4 is a diagram showing a modification of a rectifier circuit.

FIG. 4 shows an exemplary organization of such a rectifier circuit 71. One of two lines LINE1 and LINE2 (line LINE2 in the illustrated example) connects to the ground, and a grounding terminal 10 associated with the secondary connects to the ground. Here, the second node N2 is connected to the grounding terminal 10 via the second certified condenser C2, and the a.c. power is extracted from the first node N1 by the first certified condenser C1 and is half-wave rectified via the rectifying diode D1.

However, with the rectifying diode D1 alone, electric charge tends to be stored in the first certified condenser C1 as well because of voltage division from the rectified output condenser C0, and due to a small capacity of the certified condenser C1, a great rectified output voltage can not be obtained. To avoid this inconvenience, the charge pumping diode D2 is connected between a node, located between the certified condenser C1 and the rectifying diode D1, and the grounding terminal 10, to thereby comprise a half-wave rectifier circuit having a charge-pumping function.

In this rectifier circuit, the charge-pumping function is performed such that the electric charge of the grounding terminal 10 is pumped up by the diode D2 to the first certified condenser C1 when the first node N1 is at a negative half-wave phase and then the pumped-up electric charge is transferred via the diode D1 to the output condenser C0 at a next half-wave phase.

Figure 5:
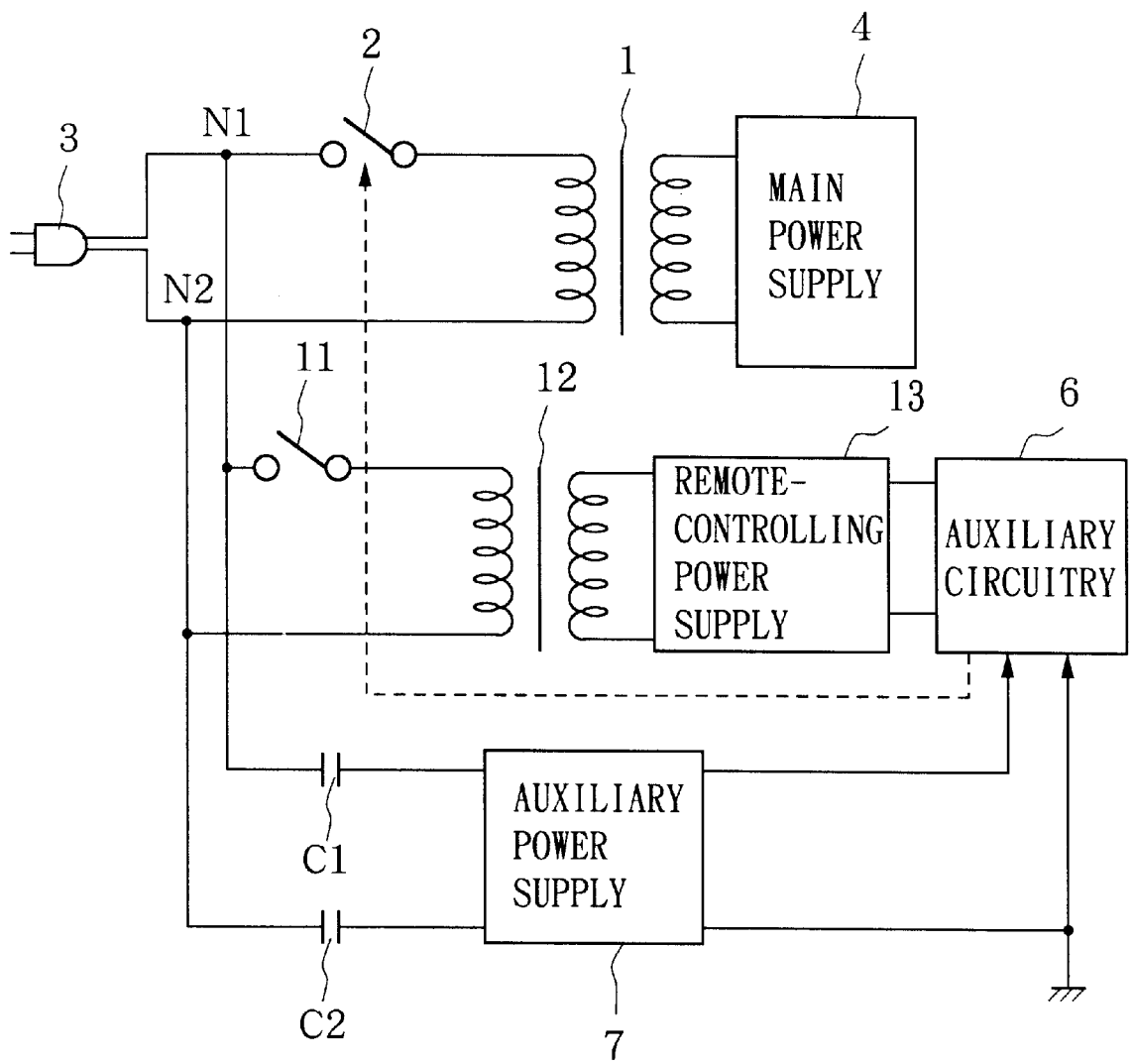
FIG. 5 is a block diagram showing a power supply circuit including a remote-controlling power supply using a sub-transformer.
Figure 6:
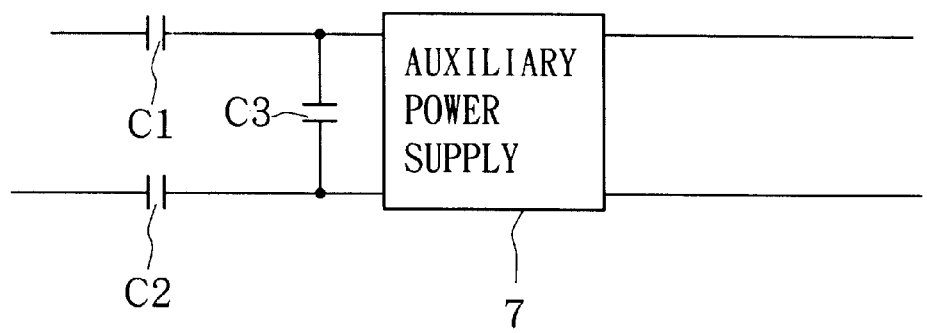
FIG. 6 is a diagram showing another embodiment of the present invention.
Figure 7:
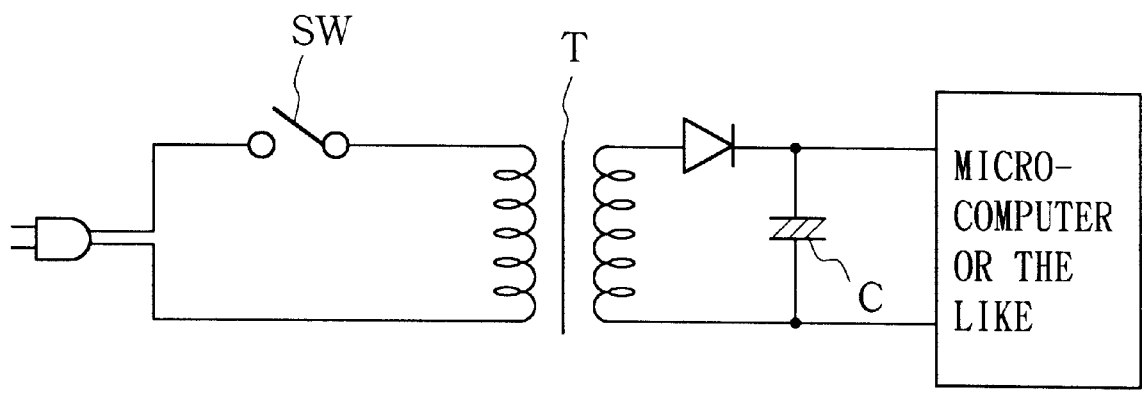
FIG. 7 is a diagram showing a conventionally-known backup power supply scheme.
Figure 8:
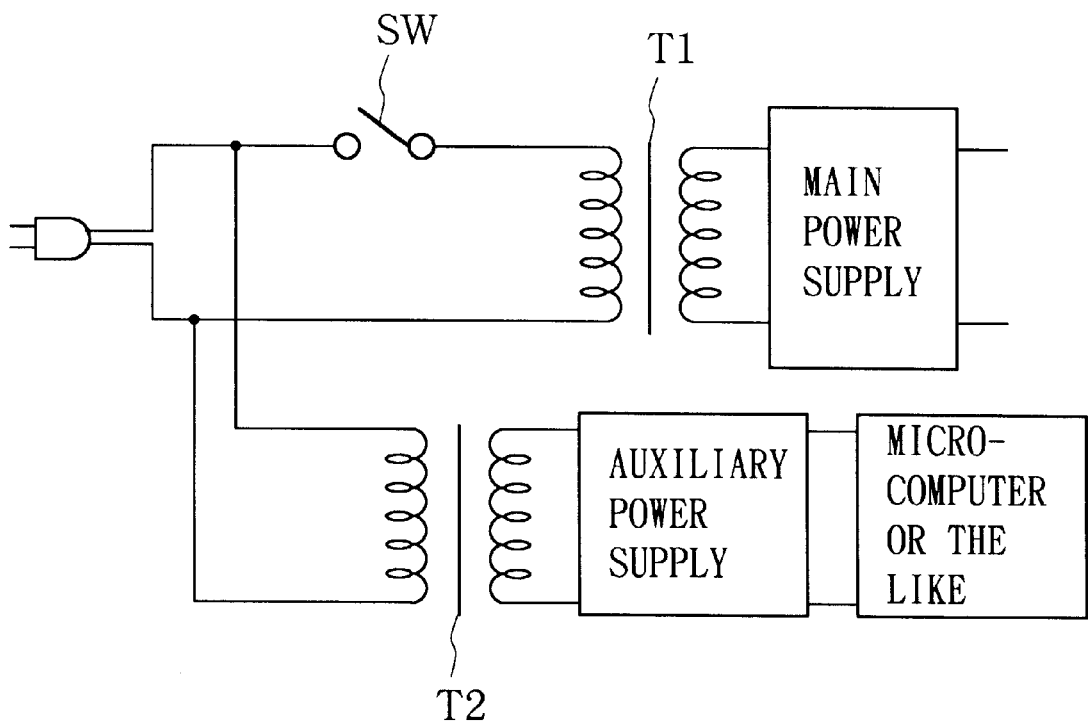
FIG. 8 is a diagram showing another conventionally-known backup power supply scheme.

FIG. 5 is a block diagram showing another embodiment of the power supply circuit structure of the present invention that is characterized by including, in addition to the arrangement of FIG. 1, a remote-controlling power supply system that is made up mainly of a sub-transformer 12 to provide for remote control operation. The sub-transformer 12 has a primary winding connected with the first and second nodes N1 and N2 via a power supply switch 11 and a secondary winding connected with a remote-controlling power supply circuitry 13. The power supply switch 2 in the main power supply system is turned ON or OFF in response to ON/OFF operation of the power supply switch 11 connected with the sub-transformer. The remote-controlling power supply circuitry 13 includes various circuits for receiving and processing radio or optical signals from a remote controller unit (not shown) normally manipulated by a human operator, and it transfers the processed results to the auxiliary circuitry 6, such as a microcomputer, so as to turn ON or OFF the power supply switch 2 of the main power supply system. As long as the power supply switch 11 connected with the sub-transformer 12 is maintained in the ON state, the power supply switch 2 of the main power supply system can be turned ON or OFF via the operation of the remote controller unit.

The auxiliary power supply circuitry for giving the necessary power backup does not necessarily require a stabilized power supply, depending on the nature of the circuitry to be backed up. Alternatively, an additional or third certified condenser C3 may be connected between the input terminals of the auxiliary power supply circuitry 7, so as to provide a predetermined voltage level through voltage division by the three certified condensers C1, C2 and C3.

In summary, the power supply circuit structure of the present invention is characterized primarily by supplying backup power via auxiliary power supply circuitry, using electric power extracted by certified condensers, without using a sub-transformer. This characteristic arrangement achieves stable backup power supply with low power consumption. Further, the use of the certified condensers to extract the electric power allows the auxiliary power supply circuitry to be treated as secondary power supply circuitry separate from a main power supply, which thus greatly facilitates layout of circuit components and wiring.

What is claimed is:

1. A power supply circuit structure comprising:

a main power supply system for supplying main electric power to electric equipment, wherein an alternating current (A.C.) power source supplies electric power to the main power supply system through an electric outlet, and the A.C. power source has a first and a second power line; and an auxiliary power supply system for supplying backup auxiliary power to the electric equipment during an OFF state of said main power supply system, said main power supply system including main power supply circuitry, a transformer that delivers A.C. power introduced, via a supply plug which is connected to the electric outlet, to said main power supply circuitry, and a power supply switch provided between a primary winding of said transformer and said supply plug, wherein A.C. power from the first power line is delivered to a first supply plug line of the supply plug, and A.C. power from the second power line is delivered to a second supply plug line of the supply plug, said auxiliary power supply system including auxiliary power supply circuitry, and a first certified condenser that separates the first supply plug line from the auxiliary power supply circuitry, and a second certified condenser that separates the second supply plug line from the auxiliary power supply circuitry, wherein the first certified condenser and the second certified condenser deliver the A.C. power introduced via said supply plug to said auxiliary power supply circuitry without intervention of said power supply switch.

2. A power supply circuit structure as recited in claim 1 wherein said auxiliary power supply circuitry includes a rectifier circuit that rectifies the a.c. power extracted via said certified condenser, and a stabilizer circuit that stabilizes an output from said rectifier circuit.

3. A power supply circuit structure as recited in claim 1 wherein in a situation where said supply plug has none of its terminals specified as a grounding terminal, said auxiliary power supply circuitry includes a full-wave rectifier circuit that rectifies the a.c. power supplied via said certified condenser from said supply plug.

4. A power supply circuit structure as recited in claim 1 wherein in a situation where said supply plug has one of its terminals specified as a grounding terminal, said auxiliary power supply circuitry includes a half-wave rectifier circuit made up of a rectifying diode that half-wave rectifies the a.c. power supplied via said certified condenser from a non-grounding terminal of said supply plug and a charge-pumping diode that is connected between a connection node, located between said rectifying diode and said certified condenser, and said grounding terminal of said supply plug.

5. A power supply circuit structure as recited in claim 1 which further comprises a remote-controlling power supply system including:

a control circuit that receives a radio signal from a remote controller and outputs a power supply control signal based on the radio signal;

a remote-controlling power supply circuit that supplies said control circuit with electric power necessary for operation of said control circuit;

a sub-transformer that delivers the a.c. power introduced via said supply plug to said remote-controlling power supply circuit; and a power supply switch provided between a primary of said transformer and said supply plug, and wherein turning-ON/OFF of said power supply switch in said main power supply system is controlled in accordance with the power supply control signal outputted by said control circuit.

6. Electric equipment comprising:

principal circuitry that is supplied with electric power only when a power supply is in an ON state;

a main power supply system for supplying main electric power to said principal circuitry, wherein an alternating current (A.C.) power source supplies electric power to the main power supply system through an electric outlet, and the A.C. power source has a first and a second power line;

auxiliary circuitry that has to be supplied with the electric power even when the power supply is in an OFF state; and an auxiliary power supply system for supplying backup auxiliary power to said auxiliary circuitry during the OFF state of the power supply, said main power supply system including main power supply circuitry, a transformer that delivers A.C. power introduced, via a supply plug which is connected to the electric outlet, to said main power supply circuitry, and a power supply switch provided between a primary winding of said transformer and said supply plug, wherein A.C. power from the first power line is delivered to a first supply plug line of the supply plug, and A.C. power from the second power line is delivered to a second supply plug line of the supply plug, said auxiliary power supply system including auxiliary power supply circuitry, and a first certified condenser that separates the first supply plug line from the auxiliary power supply circuitry, and a second certified condenser that separates the second supply plug line from the auxiliary power supply circuitry, wherein the first certified condensor and the second certified condensor deliver the A.C. power introduced via said supply plug to said auxiliary power supply circuitry without intervention of said power supply switch.

* * * * *